United States Patent
Madara et al.

(10) Patent No.: US 8,267,432 B2
(45) Date of Patent: Sep. 18, 2012

(54) COUPLING HAVING ANGULARLY ORIENTED KEY SURFACES

(75) Inventors: Scott D. Madara, Nazareth, PA (US); John W. Pierce, Nazareth, PA (US); Charles E. Wilk, Slatington, PA (US); Douglas R. Dole, Whitehouse Station, NJ (US); Michael V. Porter, Easton, PA (US)

(73) Assignee: Victaulic Company, Easton, PA (US)

( * ) Notice: Subject to any disclaimer, the term of this patent is extended or adjusted under 35 U.S.C. 154(b) by 245 days.

(21) Appl. No.: 12/707,338

(22) Filed: Feb. 17, 2010

(65) Prior Publication Data

US 2010/0148493 A1   Jun. 17, 2010

(51) Int. Cl.
*F16L 17/00* (2006.01)

(52) U.S. Cl. ........................................ 285/112; 285/367

(58) Field of Classification Search .................. 285/112, 285/367, 373, 419, 420
See application file for complete search history.

(56) References Cited

U.S. PATENT DOCUMENTS

| | | | | |
|---|---|---|---|---|
| 1,994,361 | A | * | 3/1935 | Johnson .......................... 277/605 |
| 2,230,287 | A | * | 2/1941 | Curtis ............................. 138/99 |
| 2,473,046 | A | | 6/1949 | Adams, Jr. |
| 2,473,102 | A | * | 6/1949 | Krooss .......................... 285/112 |
| 2,486,120 | A | | 10/1949 | Colten et al. |
| 2,821,415 | A | * | 1/1958 | Race, Jr. ........................ 285/112 |
| 3,015,502 | A | | 1/1962 | Frost et al. |
| 3,201,149 | A | | 8/1965 | Bragg |
| 3,283,553 | A | | 11/1966 | Taylor |
| 3,351,352 | A | | 11/1967 | Blakeley et al. |
| 3,362,730 | A | | 1/1968 | St. Clair et al. |
| 3,756,629 | A | * | 9/1973 | Gibb ............................. 285/112 |
| 4,114,414 | A | | 9/1978 | Goodman |
| 4,311,248 | A | | 1/1982 | Westerlund et al. |
| 4,391,458 | A | | 7/1983 | Blakeley |
| 4,432,558 | A | | 2/1984 | Westerlund et al. |
| 4,522,433 | A | | 6/1985 | Valentine et al. |
| 4,601,495 | A | | 7/1986 | Webb |
| 4,643,461 | A | | 2/1987 | Thau, Jr. et al. |
| 4,702,500 | A | | 10/1987 | Thau, Jr. et al. |
| 4,915,418 | A | | 4/1990 | Palatchy |
| 5,058,931 | A | | 10/1991 | Bowsher |
| 5,190,324 | A | * | 3/1993 | Bird et al. ..................... 285/328 |

(Continued)

FOREIGN PATENT DOCUMENTS

GB   2243659   11/1991

(Continued)

OTHER PUBLICATIONS

Mauries, Laurent; European Search Opinion and Search Report for EP 10 16 2886; Dec. 28, 2010; pp. 1-7.

*Primary Examiner* — Aaron Dunwoody
(74) *Attorney, Agent, or Firm* — Ballard Spahr LLP

(57) ABSTRACT

A mechanical pipe coupling is formed of segments attached end to end to surround a central space. Each segment has arcuate keys which project toward the central space. Each key is formed of a pair of side surfaces and a mid surface between them. The mid surface is angularly oriented relative to a longitudinal axis perpendicular to a plane containing the segments. When used to couple pipe elements having grooves the angular orientation of the mid surfaces provides flexibility to the joint. A method of joining pipe elements end to end is also disclosed.

35 Claims, 10 Drawing Sheets

U.S. PATENT DOCUMENTS

| | | |
|---|---|---|
| 5,246,256 A | 9/1993 | Rung et al. |
| 5,249,829 A | 10/1993 | Hendrickson |
| 5,291,769 A | 3/1994 | Miyano |
| 5,450,738 A | 9/1995 | Chatterley et al. |
| 5,560,656 A | 10/1996 | Okamura et al. |
| 5,603,508 A | 2/1997 | Dole |
| 5,778,715 A | 7/1998 | Lippka et al. |
| 6,070,914 A | 6/2000 | Schmidt |
| 6,170,884 B1 | 1/2001 | McLennan et al. |
| 6,227,577 B1 | 5/2001 | Ikeda et al. |
| 6,393,885 B1 | 5/2002 | Cadena |
| 6,565,129 B2 | 5/2003 | Surjaatmadja |
| 7,144,047 B2 * | 12/2006 | Dole ............................. 285/233 |
| 2002/0195820 A1 | 12/2002 | Surjaatmadja |
| 2005/0034499 A1 | 2/2005 | Matsumoto |
| 2005/0212284 A1 | 9/2005 | Dole |
| 2005/0258641 A1 * | 11/2005 | Gibb ............................. 285/112 |
| 2006/0284420 A1 * | 12/2006 | Dole ............................. 285/367 |
| 2008/0007061 A1 | 1/2008 | Gibb et al. |
| 2008/0048444 A1 | 2/2008 | Porter et al. |

FOREIGN PATENT DOCUMENTS

| | | |
|---|---|---|
| JP | 2007278455 A | 10/2007 |
| WO | 0057093 | 9/2000 |

* cited by examiner

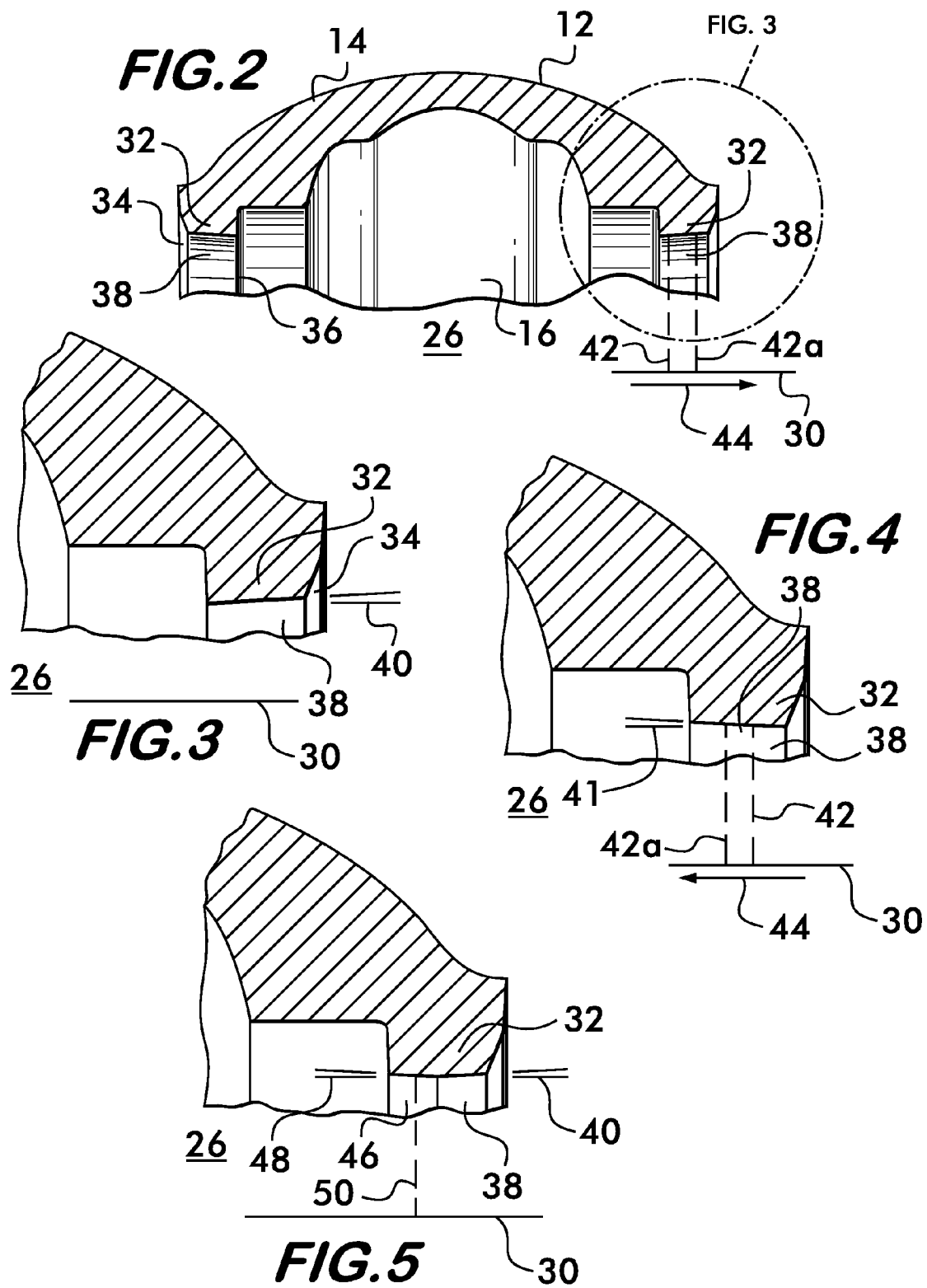

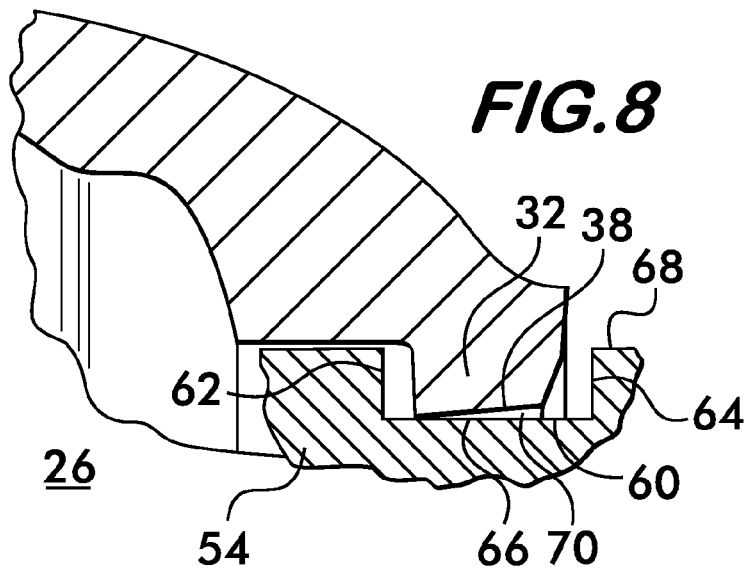
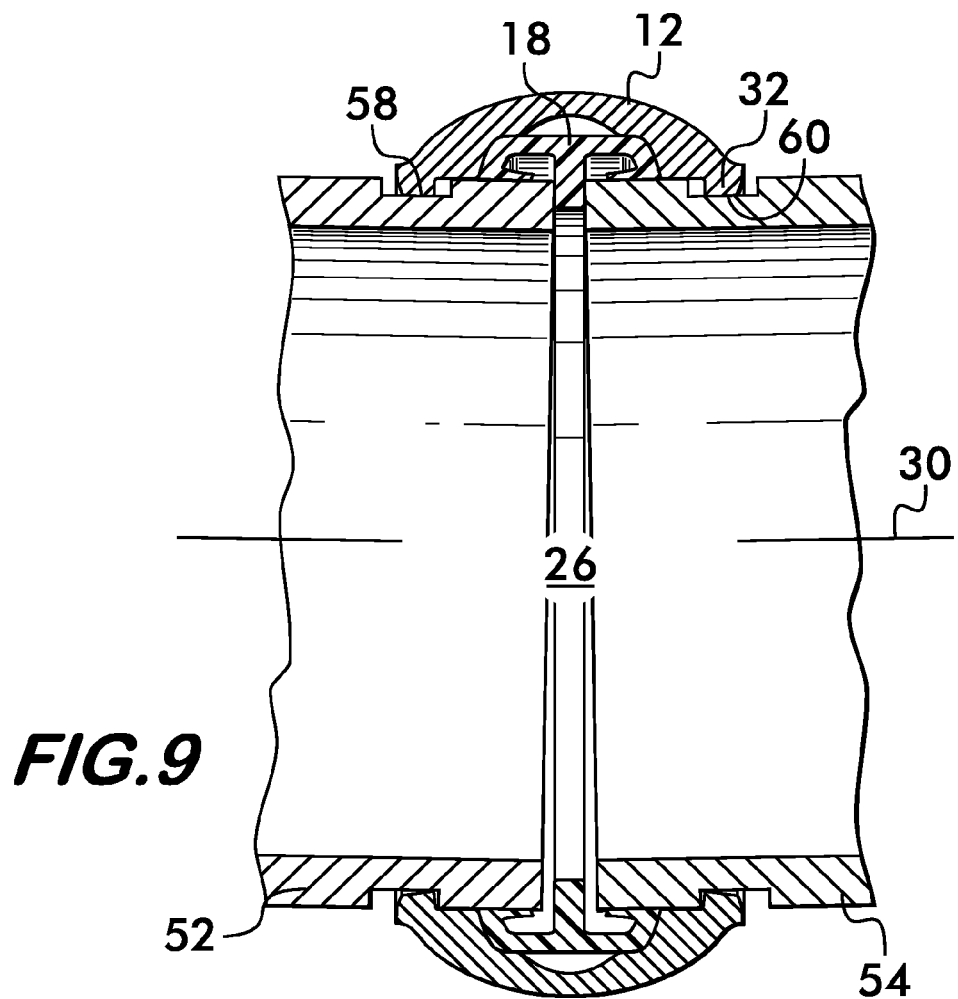

COUPLING HAVING ANGULARLY ORIENTED KEY SURFACES

FIELD OF THE INVENTION

This invention relates to mechanical couplings for flexibly joining pipe elements in end to end relation.

BACKGROUND

Mechanical pipe couplings provide various advantages over other techniques for joining pipe elements end to end. For example, they are less expensive to install than welded joints, which require skilled welders and the use of an exposed flame or arc, which are not practical or safe in every environment. Mechanical couplings may also be designed to afford a degree of flexibility at the joint, unlike welded joints which are substantially rigid. Flexibility is desired because it facilitates design and assembly of the piping network, allowing for larger dimensional and angular tolerances. It also allows for greater expansion and contraction under temperature changes without compromising the fluid tight integrity of the various joints. It would be advantageous to have a mechanical pipe coupling which is usable with standard groove pipe and which provides for angular flexibility of the pipe elements without compromising the fluid tight integrity of the joint.

SUMMARY

The invention concerns a coupling for joining pipe elements together in end to end relation. In one embodiment, the coupling comprises a plurality of segments attached end to end surrounding a central space. The segments are joined to one another by adjustably tightenable connection members, such as fasteners. At least one of the segments includes an arcuate key extending along the segment. The key projects inwardly toward the central space. The key comprises two oppositely disposed side surfaces and a first mid surface positioned between the side surfaces. The first mid surface faces radially inwardly toward the central space and is angularly oriented with respect to an axis oriented perpendicularly to a plane containing the segments. A portion of the first mid surface is engageable with an outer surface of one of the pipe elements when the pipe elements are positioned within the central space.

In one embodiment of the invention, the first mid surface is oriented such that the distance between it and the axis increases with increasing distance along the axis in a direction away from the central space. In another embodiment, the first mid surface is oriented such that the distance between it and the axis increases with increasing distance along the axis in a direction toward the central space. The first mid surface may have an orientation angle between about 1° and about 5°. It may have an orientation angle of about 3°.

In another embodiment the key further comprises a second mid surface positioned contiguous with the first mid surface. The second mid surface projects radially inwardly toward the central space. The second mid surface is angularly oriented with respect to the aforementioned axis. The second mid surface is engageable with an outer surface of one of the pipe elements when the pipe elements are positioned within the central space.

The second mid surface may have an orientation angle with a slope opposite to the slope of the first mid surface. The second mid surface may be oriented such that the distance between it and the axis increases with increasing distance along the axis in a direction away from the central space. In another embodiment, the second mid surface is oriented such that the distance between it and the axis increases with increasing distance along the axis in a direction toward the central space. The second mid surface may have an orientation angle between about 1° and about 5°. It may have an orientation angle of about 3°.

In an alternate embodiment, the coupling according to the invention comprises a plurality of segments attached end to end surrounding a central space. The segments are joined to one another by adjustably tightenable connection member such as fasteners. Each of the segments has a pair of arcuate keys extending along each of the segments. The keys project radially inwardly toward the central space. The keys of each pair are in spaced apart relation to one another. Each of the keys comprises two oppositely disposed side surfaces and a first mid surface. Each of the first mid surfaces is angularly oriented with respect to an axis oriented perpendicularly to a plane containing the segments. Portions of each of the first mid surfaces are engageable with outer surfaces of the pipe elements when the pipe elements are positioned within the central space.

In another embodiment, each of the keys further comprises a second mid surface positioned contiguous with the first mid surface. The second mid surfaces are angularly oriented with respect to the axis. The second mid surfaces are engageable with an outer surface of one of the pipe elements when the pipe elements are positioned within the central space.

Each of the second mid surfaces may have an orientation angle with a slope opposite to the slope of the first mid surface with which it is contiguous. In one embodiment, each of the second mid surfaces is oriented such that the distance between each of the second mid surfaces and the axis increases with increasing distance along the axis in a direction away from the central space. In another embodiment, each of the second mid surfaces is oriented such that the distance between each of the second mid surfaces and the axis increases with increasing distance along the axis in a direction toward the central space.

The coupling may further comprise connection members positioned at opposite ends of each of the segments for adjustably connecting one coupling segment to another. The connection members are adjustably tightenable for drawing the first mid surfaces into engagement with the outer surfaces of the pipe elements. The first mid surfaces subtend an angle of less than 180° and have a minimum radius of curvature greater than the radius of curvature of the outer surface of the pipe elements. Each of the segments is deformable upon adjustable tightening of the connection members so as to substantially conform the curvature of a portion of each of the first mid surfaces to the outer surfaces of the pipe elements.

The invention also encompasses a method of joining pipe elements in end to end relationship. The method comprises:
 (a) providing a coupling formed of a plurality of segments joined end to end by a plurality of adjustably tightenable fasteners, the segments surrounding a central space, at least one of the segments including an arcuate key extending along the segment and projecting inwardly toward the central space, the key comprising two oppositely disposed side surfaces and a first mid surface positioned therebetween, the first mid surface facing radially inwardly toward the central space, the first mid surface being angularly oriented with respect to an axis oriented perpendicularly to a plane containing the segments;
 (b) inserting the pipe elements into the central space from opposite sides of the coupling;

(c) tightening the fasteners so as to draw the segments toward one another and thereby engage a portion of the first mid surface with an outer surface of at least one of the pipe elements.

The invention further includes, in combination, a pair of pipe elements and a coupling for joining the pipe elements together in end to end relation. Each of the pipe elements has a circumferential groove located adjacent to each end. Each of the grooves comprises a pair of oppositely disposed sides and a floor. The coupling comprises a plurality of segments attached to one another end to end surrounding a central space. At least one of the segments includes an arcuate key extending along the segment. The key projects inwardly toward the central space. The key comprises two oppositely disposed side surfaces and a first mid surface positioned therebetween. The first mid surface faces radially inwardly toward the central space. The first mid surface is angularly oriented with respect to the floor of the groove. A portion of the first mid surface is engageable with the floor when the pipe elements are positioned within the central space.

BRIEF DESCRIPTION OF THE DRAWINGS

FIG. 2 is a cross sectional view taken at line 2-2 of FIG. 1;

FIG. 3 is a detailed partial cross sectional view taken from circle 3 in FIG. 2 and is shown on an enlarged scale;

FIGS. 3a, 3b, 4, 4a, 4b, 5, 5a and 5b show partial cross sectional views of additional embodiments of the coupling according to the invention.

FIG. 8 is a detailed sectional view taken from circle 8 in FIG. 7 and is shown on an enlarged scale;

FIG. 9 is a longitudinal section view illustrating the flexibility of the coupling according to the invention;

DETAILED DESCRIPTION OF EMBODIMENTS

Figure 1:
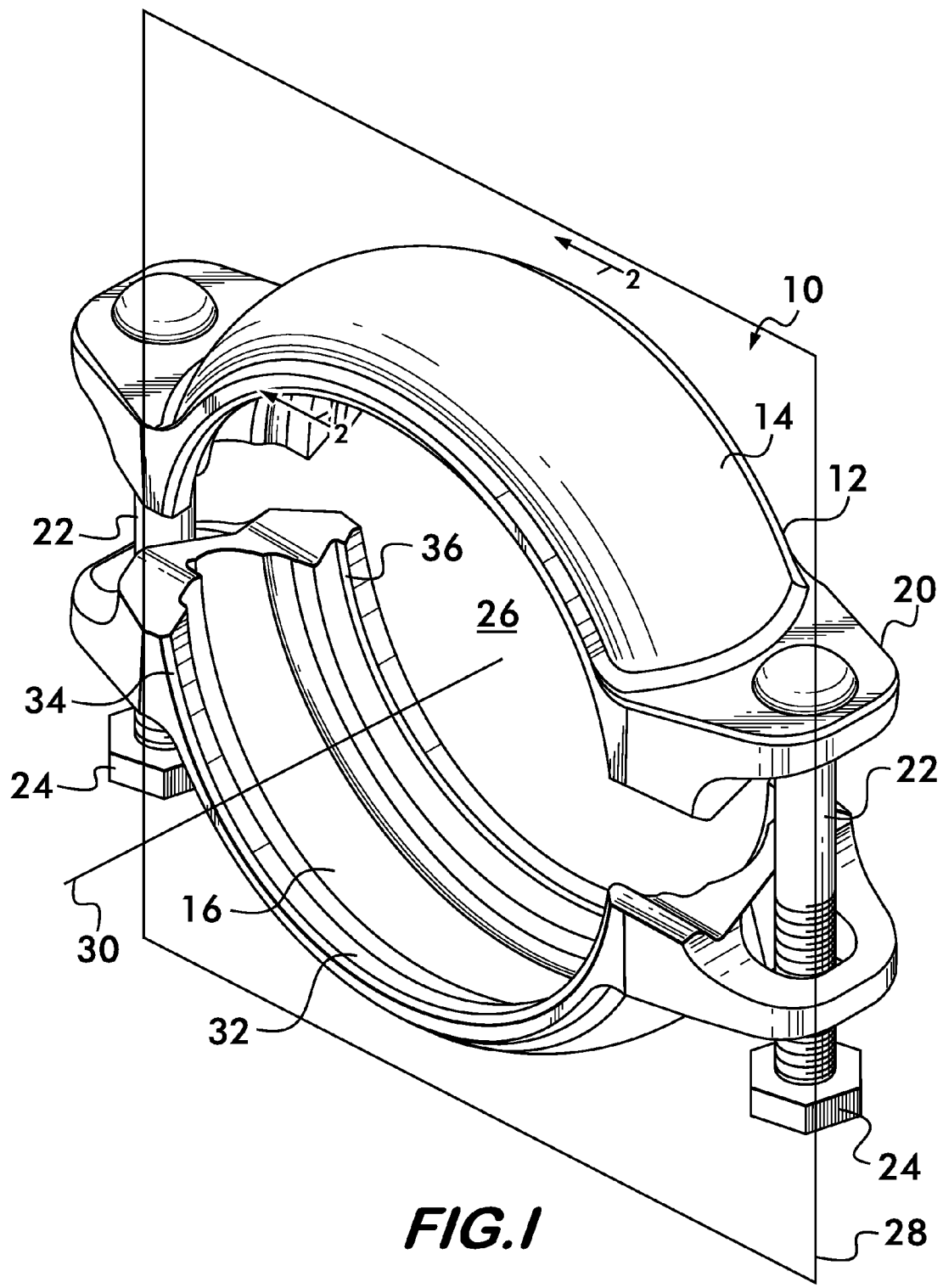
FIG. 1 is an isometric view of a coupling according to the invention.

FIG. 1 shows an isometric view of a coupling 10 according to the invention. Coupling 10 comprises a plurality of segments 12. In this example two segments are used, it being understood that more than two segments are often used to join pipe elements exceeding a certain diameter. Each segment 12 is cast from ductile iron, but may alternately be machined from metal billets or molded of plastic resin.

Segment 12 has an arcuate housing 14 which defines a recess 16. Recess 16 receives a ring seal 18 (not shown in FIG. 1 for clarity, see FIGS. 6, 7) which engages the pipe elements being joined to create a fluid tight joint. Seal 18 is formed of an elastomer such as EPDM, and is flexible and resilient to accommodate pipe element irregularities to seal the joint. Two lugs 20 are attached to the housing 14 at opposite ends of the segment 12. The lugs have openings which receive fasteners, in this case bolt 22 and nut 24. The fasteners are adjustably tightenable to draw the segments toward one another as described below.

Coupling 10 is formed by joining segments 12 in end to end relation using the fasteners as shown in FIG. 1. When assembled the coupling defines and surrounds a central space 26. A reference plane 28 may be defined as a plane which includes the segments 12. A reference axis 30 may also be defined as an axis extending substantially perpendicular to the plane 28. It is advantageous to position axis 30 at the center of the central space 26, the axis being co-axial with the longitudinal axis of pipe elements joined by the coupling.

Figure 3A:
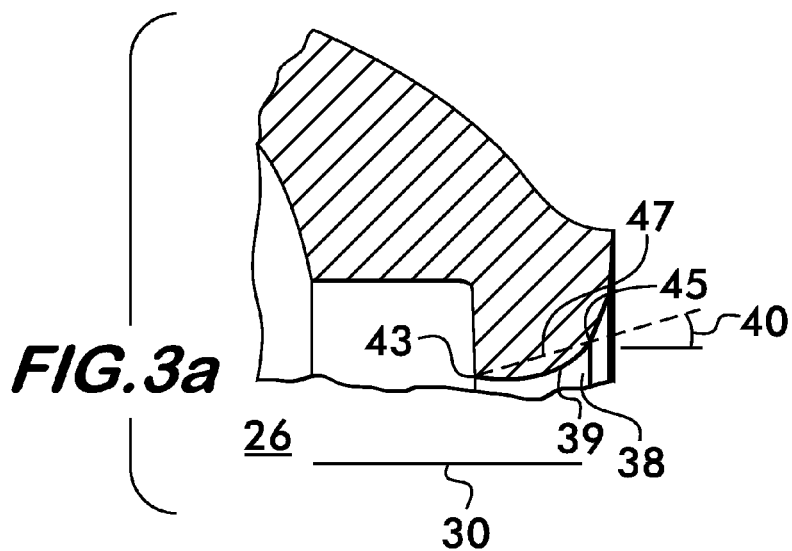

As best shown by comparing FIGS. 1 and 2, each segment 12 includes at least one, but preferably a pair of keys 32. Keys 32 of each pair are in spaced apart relation on each segment 12. Keys 32 project radially inwardly toward the central space 26 and extend along the housing 14 between the ends of segment 12. As best shown in FIG. 2, each key 32 comprises oppositely disposed side surfaces 34 and 36 and a mid surface 38 positioned between the side surfaces. Mid surface 38 faces radially inwardly toward the central space 26 and, as shown in FIG. 3, is angularly oriented with respect to axis 30. For practical designs the orientation angle 40 varies between about 1° and about 5°, with an orientation angle 40 of about 3° being advantageous.

As shown in FIG. 2, mid surface 38 is oriented such that the distance 42 between the mid surface and the axis 30 increases with increasing distance along axis 30 in a direction away from central space 26 as indicated by arrow 44. This may be seen by a comparison between distances 42 and 42a, 42a being further away from central space 26 in the direction of arrow 44 and longer than distance 42.

Figure 4A:
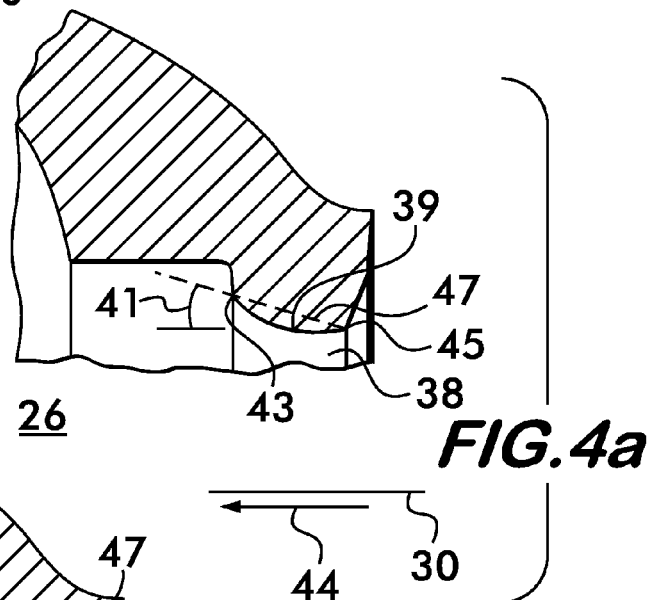

In another embodiment, shown in FIG. 4, mid surface 38 is oriented such that the distance 42 between the mid surface and the axis 30 increases with increasing distance along axis 30 in a direction toward central space 26 as indicated by arrow 44. This may be seen in FIG. 4 by a comparison between distances 42 and 42a, 42a being closer toward central space 26 in the direction of arrow 44 and longer than distance 42. Similar to the embodiment shown in FIG. 2, mid surface 38 faces radially inwardly toward the central space 26 and, as shown in FIG. 4, the mid surface is angularly oriented with respect to axis 30. In this embodiment, the slope of the orientation angle 41 is opposite to that of orientation angle 40 shown in FIG. 3. For practical designs the orientation angle 41 varies between about 1° and about 5°, with an orientation angle 41 of about 3° being advantageous.

Figure 5A:
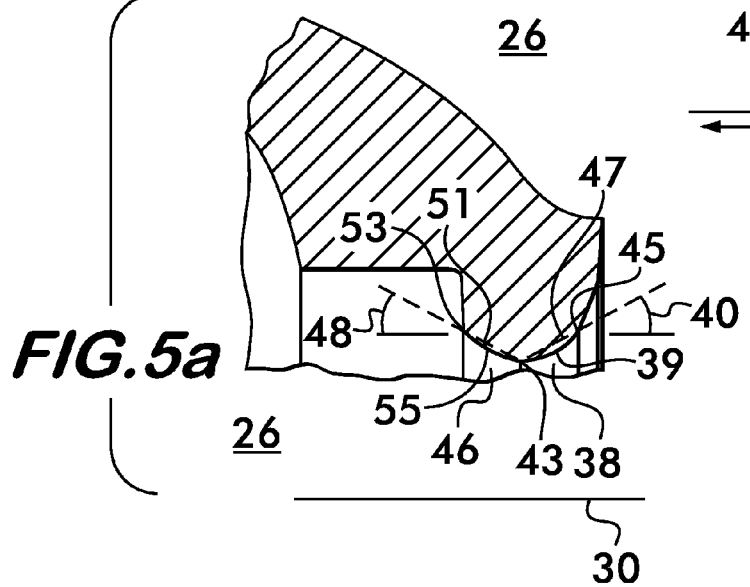

In yet another embodiment, shown in FIG. 5, each key 32 has a second mid surface 46 arranged contiguous with the first named mid surface 38. Like the first mid surface, second mid surface 46 is angularly oriented with respect to axis 30. The second mid surface may also have an orientation angle 48 between about 1° and about 5°. The distance 50 from the second mid surface 46 to axis 30 may increase with increasing distance away from the central space or increase with increasing distance toward the central space, the latter being illustrated in FIG. 5. In the example shown in FIG. 5, the slope of the second mid surface 46 is opposite to that of the first mid surface 38. By opposite slope is meant opposite in sign, and does not mean that the slopes are necessarily the same, as the orientation angle 40 of the first mid surface 38 may be different from the orientation angle 48 of the second mid surface 46 with the slopes being opposite in sign.

The mid surface or surfaces 38 and 46 need not be flat in the direction of arrows 44 as shown in FIGS. 2-5, but may have convex or concave curvature in this direction. FIG. 3a shows a mid surface 38 having convex curvature, the convex curve 39 of the surface being best seen in cross section and having end points 43 and 45. The orientation angle 40 of the convexly curved mid surface 38 is measured between a chord line 47 which passes through the end points 43 and 45 and a line parallel to the axis 30. FIG. 4a similarly shows a convexly curved mid surface 38 having a slope opposite to that of FIG. 3a, the orientation angle 41 again being measured between the chord line 47 (which passes through the end points 43 and 45 of the surface's curve 39) and a line parallel to axis 30. FIG. 5a shows an embodiment having two contiguous convexly curved mid surfaces 38 and 46 with respective orientation angles 40 and 48, each measured between respective chord lines 47 and 51 and a line parallel to axis 30. Chord line 47 passes through end points 43 and 45 of curve 39, and chord line 51 passes through end points 43 and 53 of curve 55.

Figure 3B:
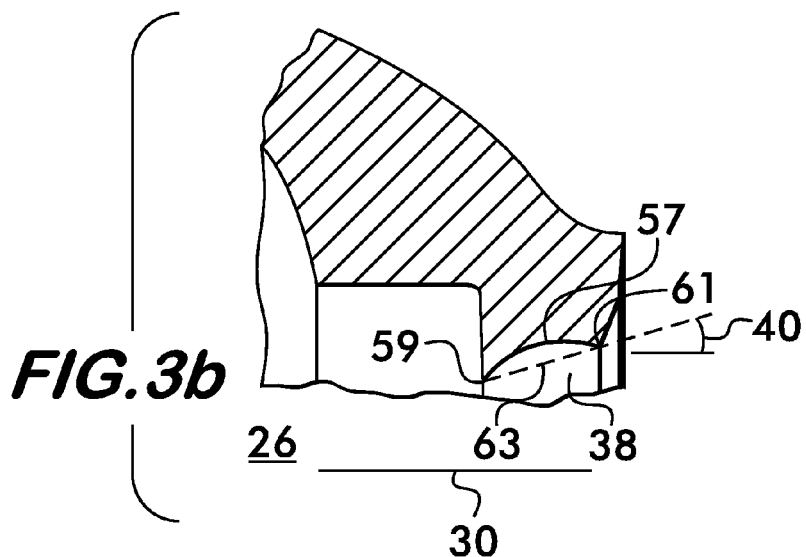
Figure 4B:
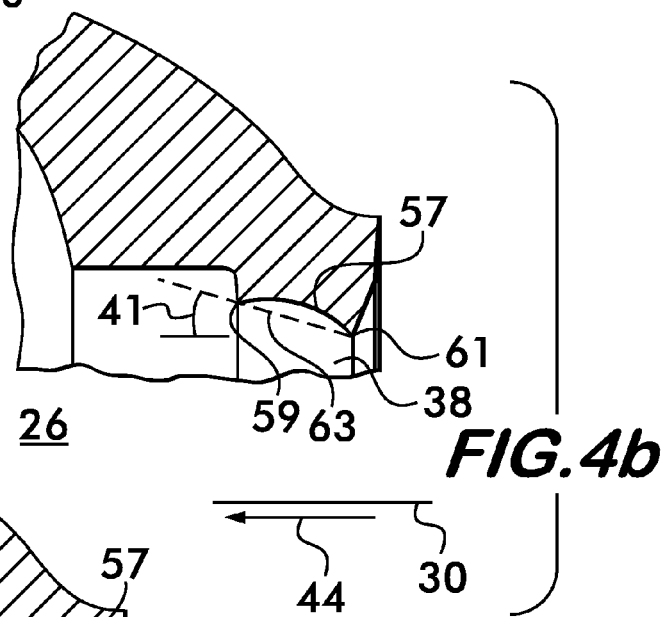
Figure 5B:
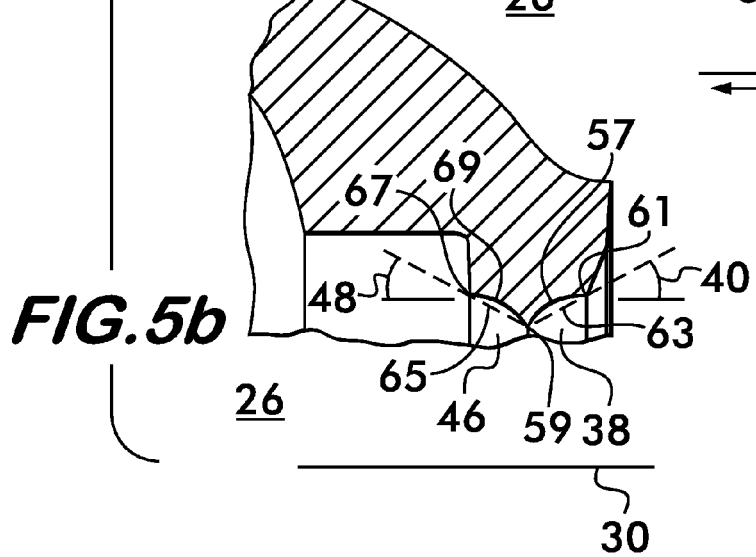

In an alternate embodiment, shown in FIG. 3b, the mid surface 38 has concave curvature, the concave curve 57 of the surface being best seen in cross section and having end points 59 and 61. The orientation angle 40 of the convexly curved mid surface 38 is measured between a chord line 63 (which passes through the end points 59 and 61) and a line parallel to the axis 30. FIG. 4b similarly shows a concavely curved mid surface 38 having a slope opposite to that of FIG. 3b, the orientation angle 41 again being measured between the chord line 63 (which passes through the end points 59 and 61 of the surface's curve 57) and a line parallel to axis 30. FIG. 5b shows an embodiment having two contiguous concavely curved mid surfaces 38 and 46 with respective orientation angles 40 and 48, each measured between respective chord lines 63 and 65 and a line parallel to axis 30. Chord line 63 passes through end points 59 and 61 of curve 57, and chord line 65 passes through end points 59 and 67 of curve 69.

Figure 6:
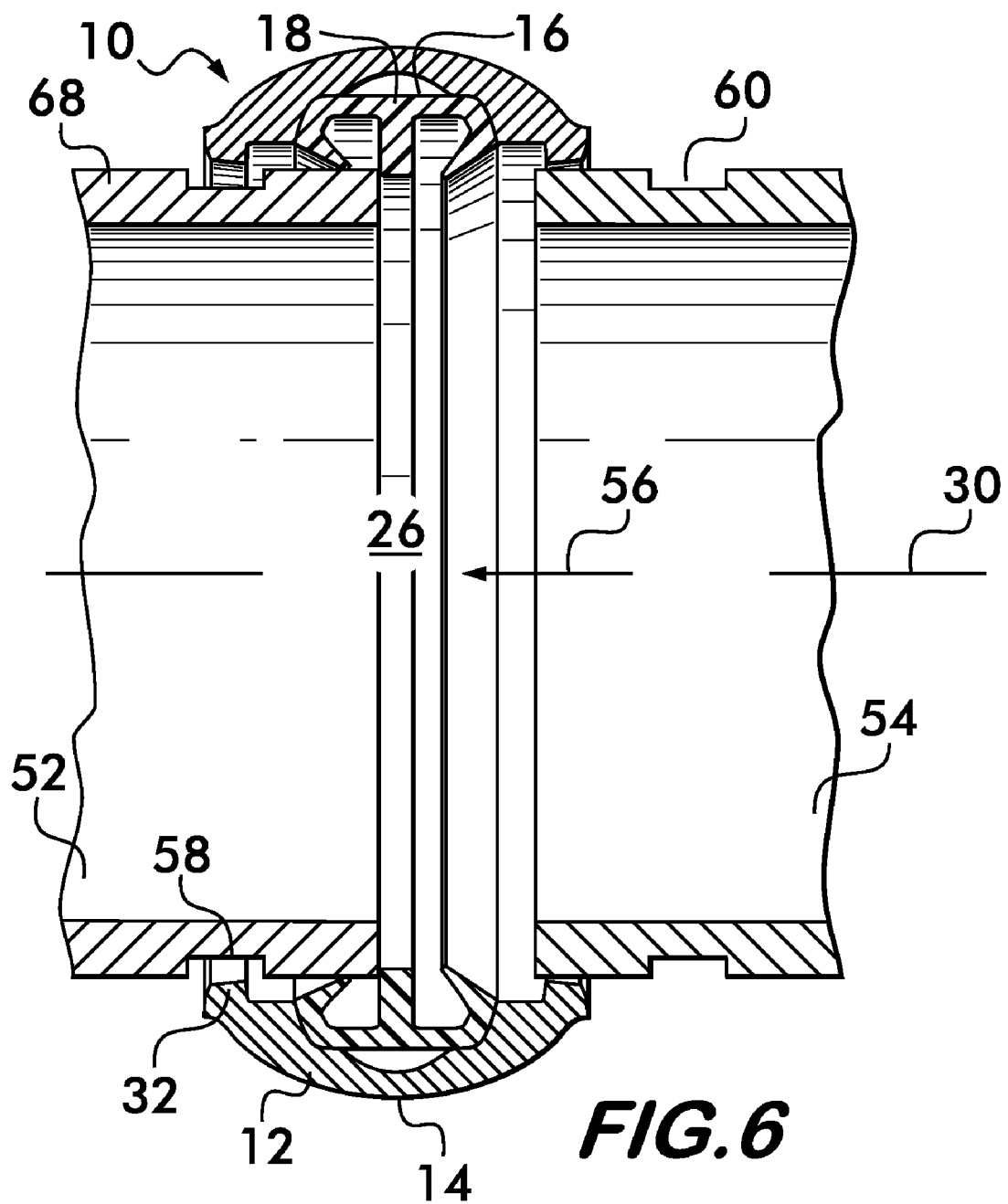
FIGS. 6 and 7 are longitudinal sectional views illustrating assembly of a pipe joint using a coupling according to the invention.
Figure 7:
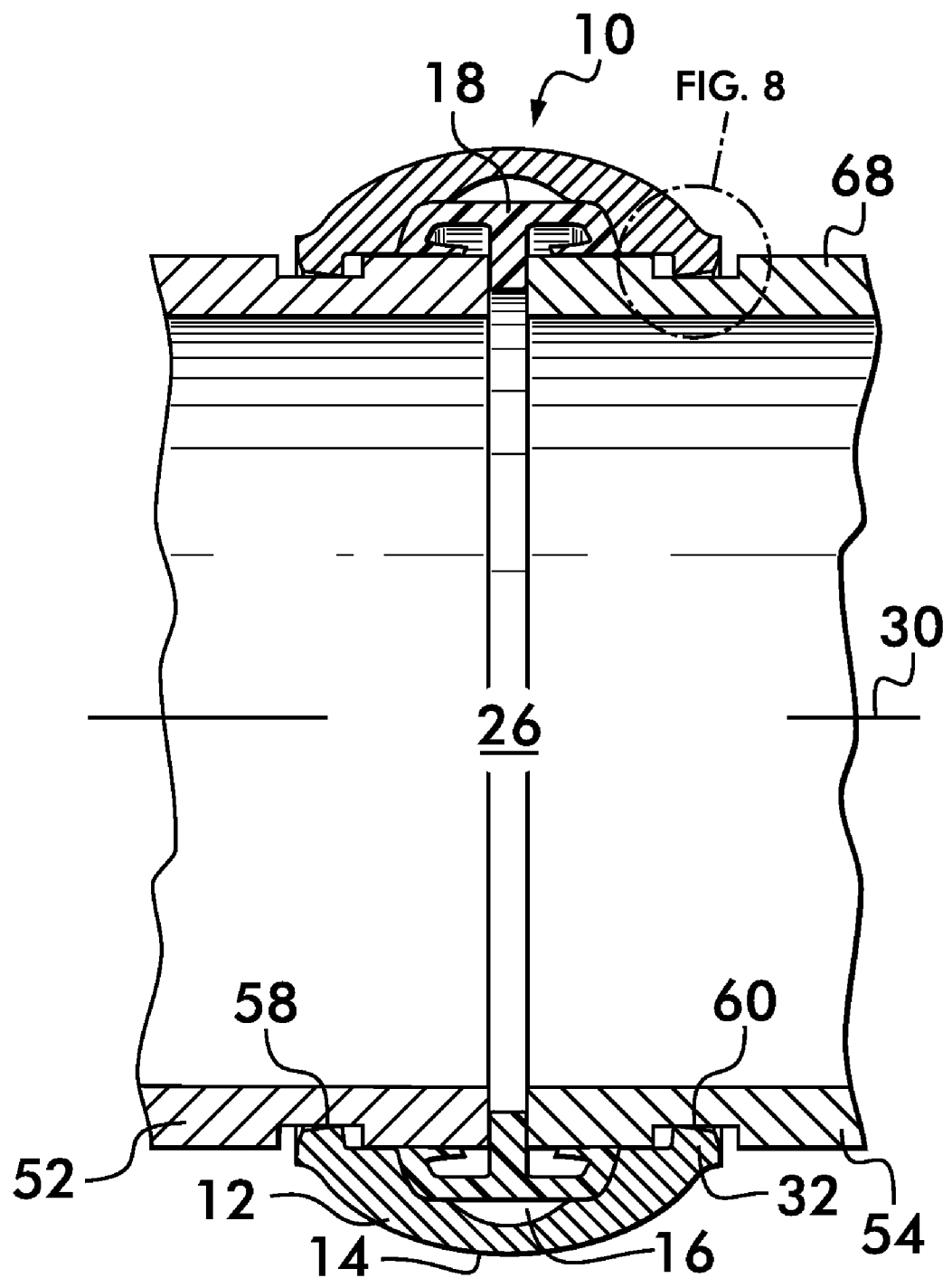

FIGS. 6 and 7 illustrate a method of joining pipe elements 52 and 54 in end to end relation according to the invention. Coupling 10 is provided with the segments 12 in spaced apart relation (see FIG. 1) and the bolts 22 only loosely fastened. Pipe element 52 is inserted into the central space 26 where it engages seal 18. Next, pipe element 54 is inserted from the opposite direction into central space 26 as shown by arrow 56. The pipe element is inserted into engagement with seal 18. Bolts 22 are then tightened and segments 12 are drawn toward one another, forcing the keys 32 into engagement with the outer surfaces of pipe elements 52 and 54 as shown in FIG. 7. The outer surfaces of the pipe elements have circumferential grooves 58 and 60 which receive the keys 32. It is noted that the surfaces forming the grooves are also considered to be part of the outer surface of the pipe elements. As best shown in FIG. 8, groove 60 has oppositely disposed sides 62 and 64 and a floor 66. (Groove 58 may be similarly described.) In this embodiment, the floor 66 is substantially parallel to the remainder of the pipe outer surface 68. Seal 18 is also compressed within the recess 16 between the segments and the pipe outer surfaces and acts to ensure a fluid tight joint.

As shown in FIG. 8, the angular orientation of mid surface 38 permits a gap 70 to form between floor 66 and the mid surface. This gap extends circumferentially around the key, increases with increasing distance from the central space 26 and provides flexibility between the coupling and the pipe elements allowing for relative deflection of the pipe elements 52 and 54 (see FIG. 9) without imposing significant stress on the coupling. Furthermore, the angular orientation of the mid surface 38 does not significantly induce straightening of pipes which start out angularly oriented.

Figure 10:
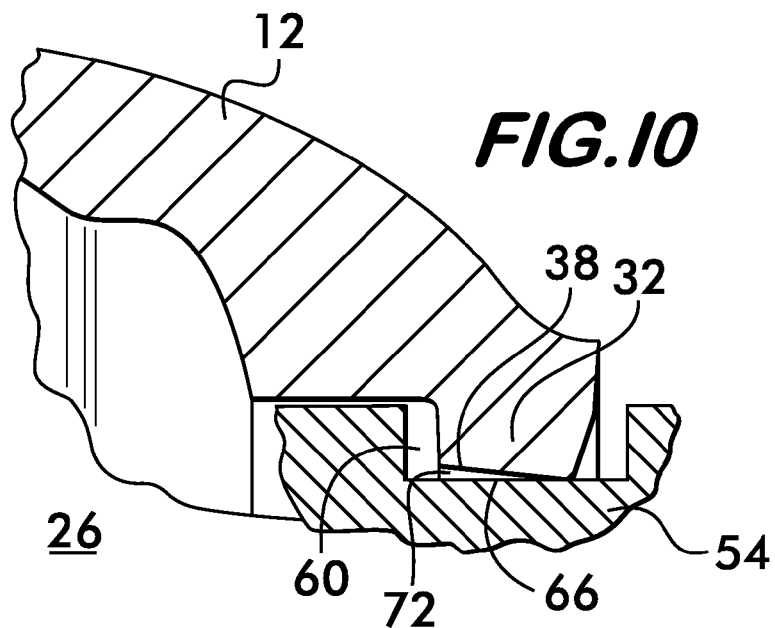
FIGS. 10 and 11 are partial cross sectional views showing the embodiments of FIGS. 4 and 5 respectively engaged with pipe elements.
Figure 11:
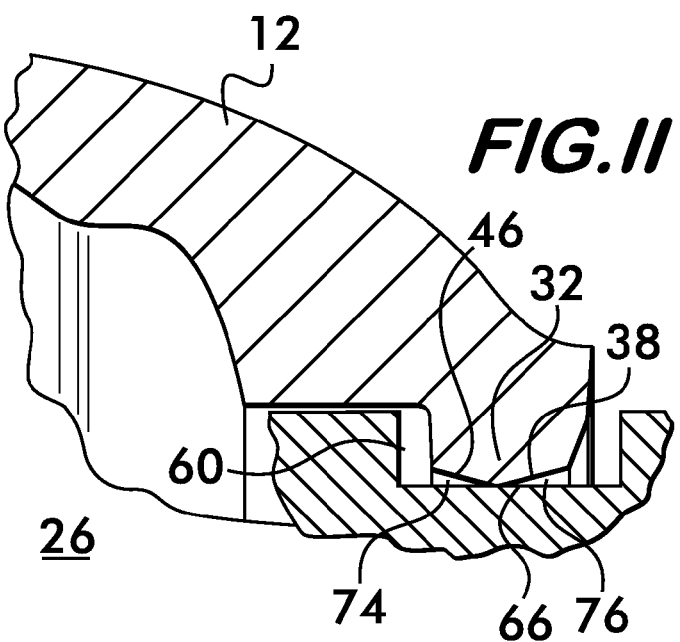

Similar flexibility between the pipe elements and the coupling is also afforded by the coupling embodiment shown in FIGS. 4 and 10, wherein the mid surface 38 is angularly oriented to form a gap 72 between the mid surface and the floor 66 which increases with increasing distance toward the central space 26. Furthermore, the coupling embodiment shown in FIGS. 5 and 11, having first and second angularly oriented mid surfaces 38 and 46 respectively, provides two gaps 74 and 76 between the mid surfaces and the groove floor 66 to provide flexibility to the joint formed between the pipe elements by the coupling.

Figure 12:
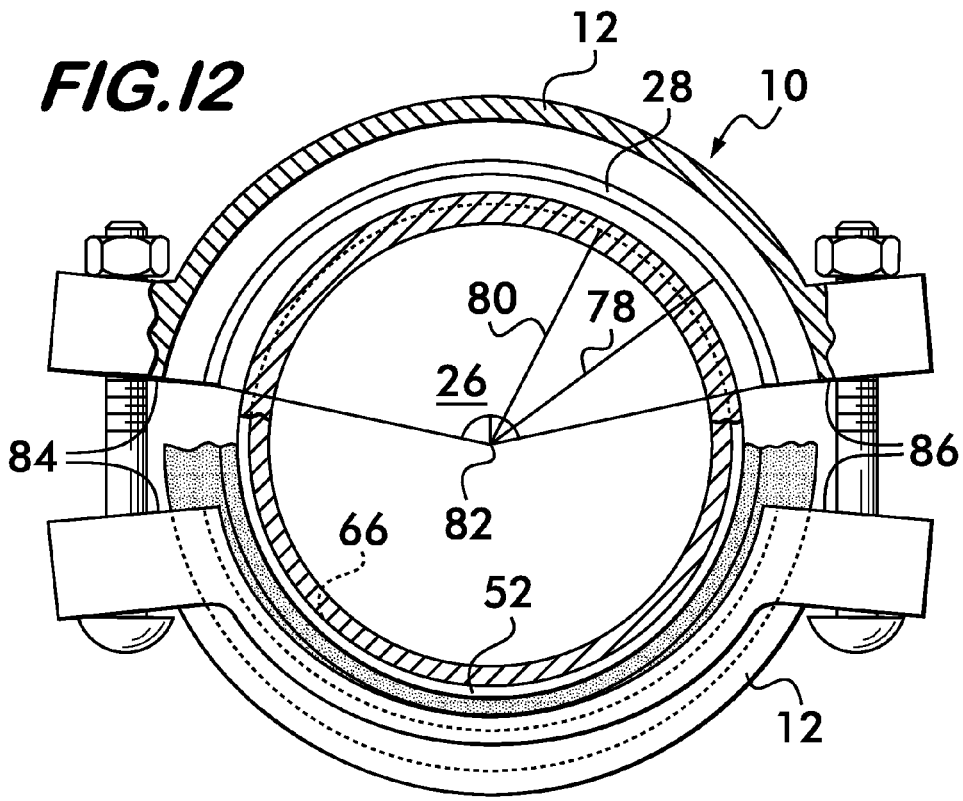
FIGS. 12 and 13 are cross sectional views of a deformable coupling according to the invention.
Figure 13:
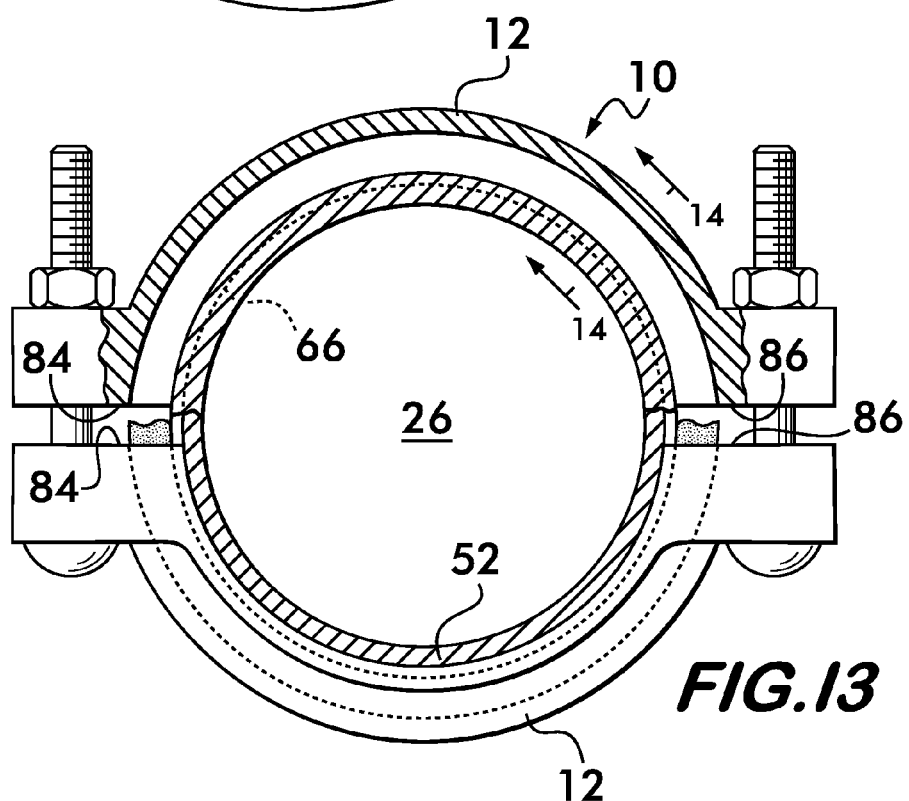
Figure 14:
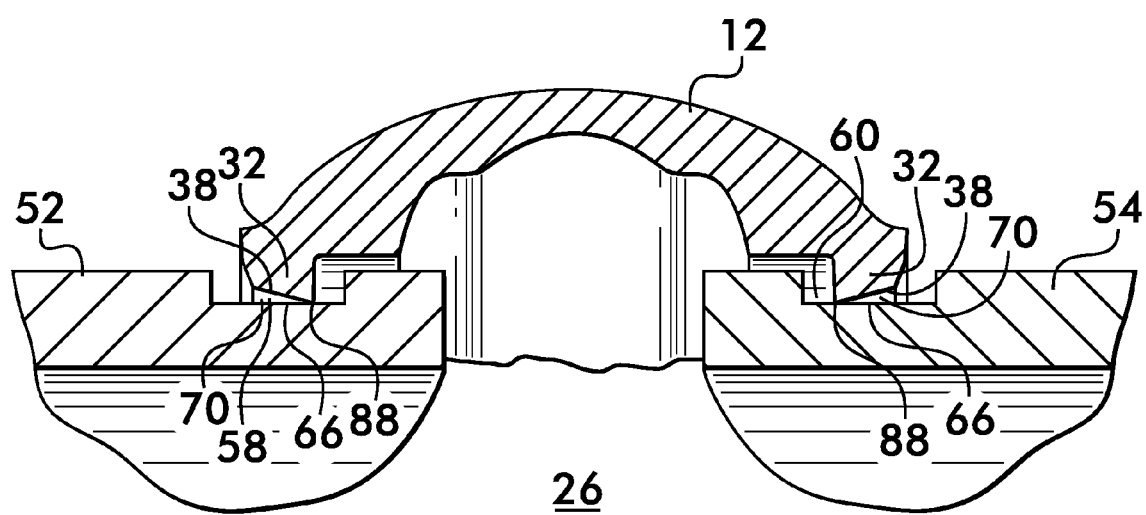
FIG. 14 is a sectional view take at line 14-14 of FIG. 13.

As shown in FIG. 12, to provide sufficient clearance between segments 12 when they are connected to one another in spaced relation so that the pipe elements 52 and 54 may be inserted into the central space 26 without disassembling the coupling 10 it is advantageous that the minimum radius of curvature 78 of the mid surfaces 38 of keys 32 be greater than the radius 80 of the floor 66 of the grooves 58 and 60 on the pipe elements. It is further advantageous that the angle 82 subtended by the keys 32 be less than 180°. As shown in FIG. 12, this configuration of mid surface radius and subtended key angle provides clearance between the pipe element outer surface and the ends 84 and 86 of segments 12. This end clearance permits a closer spacing of the segments while still allowing insertion of the pipe elements which, in turn, allows fasteners 22 to be shorter and thereby yields a practical design. When the fasteners are tightened to draw the segments toward one another and effect engagement between the groove floor 66 and the mid surface 38 of keys 32 (see FIG. 13) the segments deform so as to substantially conform a portion 88 of the mid surface 38 to the outer surface of the pipe elements (that being the floor 66 of the grooves) as shown in FIG. 14. Portion 88 extends circumferentially around the segments 12 but does not include the entire area of the mid surfaces 38, the gap 70 still being present to ensure flexibility and permit deflections of the pipe elements 52 and 54. The angular orientation of the mid surface 38 counteracts the tendency of the deformable coupling to stiffen the joint.

When used to couple pipes having grooves the angularly oriented mid surfaces of the coupling 10 according to the invention provide for a significant degree of angular flexibility without compromising the fluid tight integrity of the joint.

What is claimed is:

1. In combination, pipe elements and a coupling for joining said pipe elements together in end to end relation, said coupling comprising:
   a plurality of segments attached to one another end to end surrounding a central space;
   connection members positioned at opposite ends of said segments for adjustably connecting one coupling segment to another;
   at least one of said segments including an arcuate key extending along said segment and projecting inwardly toward said central space, said key comprising two oppositely disposed side surfaces and a first mid surface positioned therebetween, said first mid surface facing radially inwardly toward said central space, said first mid surface being angularly oriented with respect to an axis oriented perpendicularly to a plane containing said segments, a portion of said first mid surface being engageable with an outer surface of one of said pipe elements when said pipe elements are positioned within said central space, said connection members being adjustably tightenable for drawing said first mid surface into engagement with said outer surface of said one pipe element; and
   wherein said first mid surface subtends an angle of less than 180° and has a minimum radius of curvature greater than the radius of curvature of said outer surface of said pipe element, at least said one segment being deformable upon adjustable tightening of said connection members so as to substantially conform the curvature of a portion of said first mid surface to the outer surface of said pipe element.

2. The combination according to claim 1, wherein said first mid surface is oriented such that the distance between said first mid surface and said axis increases with increasing distance along said axis in a direction away from said central space.

3. The combination according to claim 1, wherein said first mid surface is oriented such that the distance between said first mid surface and said axis increases with increasing distance along said axis in a direction toward said central space.

4. The combination according to claim 1, wherein said first mid surface has an orientation angle between about 1° and about 5°.

5. The combination according to claim 1, wherein said first mid surface has an orientation angle of about 3°.

6. The combination according to claim 1, wherein said first mid surface is curved, said first mid surface having an orientation angle measured between a chord line through end points of said first mid surface and said axis.

7. The combination according to claim 6, wherein said first mid surface has a convex curvature.

8. The combination according to claim 6, wherein said first mid surface has a concave curvature.

9. The combination according to claim 1, wherein said key further comprises a second mid surface positioned contiguous with said first mid surface, said second mid surface projecting radially inwardly toward said central space, said second mid surface being angularly oriented with respect to said axis, said second mid surface being engageable with an outer surface of one of said pipe elements when said pipe elements are positioned within said central space.

10. The combination according to claim 9, wherein said second mid surface has an orientation angle with a slope opposite to the slope of said first mid surface.

11. The combination according to claim 9, wherein said second mid surface is oriented such that the distance between said second mid surface and said axis increases with increasing distance along said axis in a direction away from said central space.

12. The combination according to claim 9, wherein said second mid surface is oriented such that the distance between said second mid surface and said axis increases with increasing distance along said axis in a direction toward said central space.

13. The combination according to claim 9, wherein said second mid surface has an orientation angle between about 1° and about 5°.

14. The combination according to claim 9, wherein said second mid surface has an orientation angle of about 3°.

15. The combination according to claim 9, wherein said second mid surface is curved, said second mid surface having an orientation angle measured between a chord line through end points of said second mid surface and said axis.

16. The combination according to claim 15, wherein said second mid surface has a convex curvature.

17. The combination according to claim 15, wherein said second mid surface has a concave curvature.

18. The combination according to claim 1 comprising two said segments.

19. The combination according to claim 1, wherein said segments are attached to one another in spaced apart relation.

20. The combination according to claim 1, wherein each of said segments has a cavity therein, said cavity on each segment extending lengthwise along said segment and facing said central space, a seal being located within said cavity.

21. The combination according to claim 1, wherein said segments are attached to one another in spaced apart relation.

22. In combination, pipe elements and a coupling for joining pipe elements together in end to end relation, said coupling comprising:
  a plurality of segments attached to one another end to end surrounding a central space;
  connection members positioned at opposite ends of said segments for adjustably connecting one coupling segment to another;
  each of said segments having a pair of arcuate keys extending along each of said segments and projecting radially inwardly toward said central space, said keys of each said pair being in spaced apart relation to one another, each of said keys comprising two oppositely disposed side surfaces and a first mid surface, each of said first mid surfaces being angularly oriented with respect to an axis oriented perpendicularly to a plane containing said segments, portions of said first mid surfaces being engageable with outer surfaces of said pipe elements when said pipe elements are positioned within said central space, said connection members being adjustably tightenable for drawing said first mid surfaces into engagement with said outer surfaces of said pipe elements; and
  wherein said first mid surfaces subtend an angle of less than 180° and have a minimum radius of curvature greater than the radius of curvature of said outer surface of said pipe elements, each of said segments being deformable upon adjustable tightening of said connection members so as to substantially conform the curvature of a portion of each of said first mid surfaces to the outer surfaces of said pipe elements.

23. The combination according to claim 22, wherein said first mid surfaces on each of said pairs of said keys are oriented such that the distance between said first mid surfaces and said axis increases with increasing distance along said axis in a direction away from said central space.

24. The combination according to claim 22, wherein said first mid surfaces on each of said pairs of said keys are oriented such that the distance between said first mid surfaces and said axis increases with increasing distance along said axis in a direction toward said central space.

25. The combination according to claim 22, wherein said first mid surfaces have an orientation angle between about 1° and about 5°.

26. The combination according to claim 22, wherein each of said first mid surfaces has an orientation angle of about 3°.

27. The combination according to claim 22, wherein each of said keys further comprises a second mid surface positioned contiguous with said first mid surface, said second mid surfaces being angularly oriented with respect to said axis, said second mid surfaces being engageable with an outer surface of one of said pipe elements when said pipe elements are positioned within said central space.

28. The combination according to claim 27, wherein each of said second mid surfaces has an orientation angle with a slope opposite to the slope of said first mid surface with which it is contiguous.

29. The combination according to claim 27, wherein each of said second mid surfaces is oriented such that the distance between each of said second mid surfaces and said axis increases with increasing distance along said axis in a direction away from said central space.

30. The combination according to claim 27, wherein each of said second mid surfaces is oriented such that the distance between each of said second mid surfaces and said axis increases with increasing distance along said axis in a direction toward said central space.

31. The combination according to claim 27, wherein each of said second mid surfaces has an orientation angle between about 1° and about 5° degrees.

32. The combination according to claim 27, wherein each of said second mid surfaces has an orientation angle of about 3° degrees.

33. The combination according to claim 22 comprising two said segments.

34. The combination according to claim 22, wherein each of said segments has a cavity therein, said cavity on each said segment extending lengthwise along said segment and facing said central space, a seal being located within said cavity.

35. The combination according to claim 22, wherein said segments are attached to one another in spaced apart relation.

* * * * *